(12) United States Patent
DeKalb

(10) Patent No.: US 8,407,930 B2
(45) Date of Patent: Apr. 2, 2013

(54) ADVANCED POWERED TRIGGER SYSTEM "SUPPORT MECHANISM" FOR CAGE AND OR CORRAL-TYPE ANIMAL TRAPS

(75) Inventor: Kirk Alan DeKalb, Doerun, GA (US)

(73) Assignee: Kirk Alan DeKalb, Doerun, GA (US)

( * ) Notice: Subject to any disclaimer, the term of this patent is extended or adjusted under 35 U.S.C. 154(b) by 618 days.

(21) Appl. No.: 12/462,978

(22) Filed: Sep. 16, 2009

(65) Prior Publication Data

US 2011/0061288 A1 Mar. 17, 2011

(51) Int. Cl.
*A01M 23/00* (2006.01)
(52) U.S. Cl. .................... 43/61; 43/62; 43/67
(58) Field of Classification Search ............... 43/61, 62, 43/67, 60
See application file for complete search history.

(56) References Cited

U.S. PATENT DOCUMENTS

| 49,378 | A | * | 8/1865 | Churchhill | 43/67 |
|---|---|---|---|---|---|
| 583,924 | A | * | 6/1897 | McCoy | 43/61 |
| 928,649 | A | * | 7/1909 | Franks | 43/62 |
| 2,447,147 | A | * | 8/1948 | Warner | 43/61 |
| 2,478,286 | A | * | 8/1949 | Lanza | 43/62 |
| 4,080,749 | A | * | 3/1978 | Gilbaugh | 43/61 |
| 4,159,590 | A | * | 7/1979 | Palfalvy | 43/61 |
| 4,766,692 | A | * | 8/1988 | Shurden | 43/78 |
| 4,829,701 | A | * | 5/1989 | ImBrogno | 43/61 |
| 5,199,210 | A | * | 4/1993 | Nastas | 43/61 |
| 6,543,179 | B1 | * | 4/2003 | Lee | 43/61 |
| 6,618,982 | B2 | * | 9/2003 | Lafforthun | 43/61 |
| 8,061,076 | B2 | * | 11/2011 | Kelley | 43/61 |
| 2004/0107630 | A1 | * | 6/2004 | Evans et al. | 43/61 |
| 2009/0293340 | A1 | * | 12/2009 | Kelley | 43/61 |

* cited by examiner

*Primary Examiner* — Christopher P Ellis

(57) ABSTRACT

An animal trap includes a frame with a support mechanism for the trigger. The support mechanism has an elongate slot on each side that supports a pivot component that is attached to the frame. One or more rods are activated from the support mechanism to release a latch or door of the trap. A rod pushes or pulls from their attachment to the support mechanism when a trigger attached to the pivot component moves causing a cam on the pivot component to release the dog from engagement with the support mechanism.

8 Claims, 14 Drawing Sheets

GUILLOTINE-STYLE SIDE-ENTRY DOOR
CAGE TRAP
RIGHT-HAND ISOMETRIC VIEW

GUILLOTINE-STYLE SIDE-ENTRY DOOR
CAGE TRAP
LEFT-HAND ISOMETRIC VIEW

GUILLOTINE-STYLE SIDE-ENTRY DOOR
CAGE TRAP
RIGHT-HAND ISOMETRIC VIEW

SUPPORT MECHANISM & POWERED RELEASE RODS
RIGHT-HAND ISOMETRIC VIEW
TYPICAL ARRANGEMENT AS MANIFEST IN GUILLOTINE-STYLE SIDE-ENTRY DOOR CAGE TRAP

SECTION A-A

GUILLOTINE-STYLE SIDE-ENTRY DOOR CAGE TRAP

SUPPORT MECHANISM
GUILLOTINE-STYLE SIDE-ENTRY DOOR
CAGE TRAP

SLOTTED-END DOUBLE SUPPORT MECHANISM
LEFT-HAND ISOMETRIC VIEW

SLOTTED-END DOUBLE SUPPORT MECHANISM
THREE-VIEW

SECTION A-A
SLOTTED-END DOUBLE SUPPORT MECHANISM

SIDE ELEVATION VIEW

VIEW B-B
SLOTTED-END DOUBLE SUPPORT MECHANISM
THREE-VIEW

TABBED SINGLE SUPPORT MECHANISM
LEFT-HAND ISOMETRIC VIEW

TABBED SINGLE SUPPORT MECHANISM
THREE-VIEW

ADVANCED POWERED TRIGGER SYSTEM "SUPPORT MECHANISM" FOR CAGE AND OR CORRAL-TYPE ANIMAL TRAPS

BACKGROUND OF THE INVENTION

1. Field of the Invention

The present invention relates to animal traps and, more particularly, to a powered trigger system for cage-type animal traps.

2. Description of the Related Art

Cage trapping is old and well-know. It involves coaxing, baiting, or enticing an animal to enter a cage, allowing the animal to become trapped when a trigger mechanism is actuated by the animal while inside the cage by closing the cage doors and locking the animal in. Usually, cages are shaped like a square or rectangular box. Most cage traps have one door, and some varieties of cage traps may have two doors located on opposing ends of the cage.

Trigger mechanisms are used to close trap doors and cage the animal. Such trigger mechanisms have been used to actuate the closing of cage doors throughout history. A trigger could be as simple as moving a stick with a string where the stick is holding the box up. Most basic trigger systems move a latch or slide from a door, allowing the door to close when the animal steps on a pan or metal pad. The standard CONIBEAR trap mechanism has been around for many years and has a trigger system useful for cage traps.

As the years have progressed, the technology behind trigger systems has evolved slowly, and a need exists for improvement of the traditional trigger systems. Existing trigger mechanisms experience effectiveness problems when there is substantial door pressure on a cage trap. In essence, the pan requires too much force to actuate the trigger because of the relationship between the force on the pan and the pressure on the trap door. Therefore, a need exists for an improved trigger mechanism in which substantial pressure on the door of the cage trap does not decrease the effectiveness of the trigger mechanism.

BRIEF SUMMARY OF THE INVENTION

The invention provides a support mechanism for a powered trigger system for the mounting on cage-type animal traps in a configuration on the back, side, bottom, top, and inside or outside of the cage. It allows the trigger mechanism to operate a single door or multiple doors with a variety of design configurations, enhancing the capabilities for the cage type trap to allow for more designs and advanced methods for catching of animals. The support mechanism may also be used in other applications with a powered or unpowered doors and a trigger besides cage traps, including a device for the unassisted closing of a cattle chute or other large pen type trap. A pad or wire trigger system like used with a CONIBEAR brand trap can be used in combination with the support mechanism.

BRIEF DESCRIPTION OF THE SEVERAL VIEWS OF THE DRAWINGS

Guillotine-Style Door Example

FIG. 1 is a left-hand isometric view of a cage-type side door (side-entry) animal trap with a support mechanism in place ready to function in accordance with an embodiment of the invention. Wire webbing for the cage is left out for visual effect.

FIG. 2 is a right-hand isometric view of a guillotine-style side-entry door cage trap with support mechanism.

FIG. 3 is a right-hand isometric view of a support mechanism and powered release rods of the invention in a typical arrangement as manifest in a guillotine-style side-entry door cage trap.

FIG. 4 is a combination of a plan view, front elevation view, and side elevation view of a guillotine-style side entry door cage trap that depicts the support mechanism of the invention.

FIG. 5 is a sectional elevation view of the support mechanism of the invention and powering rods.

FIG. 6 is a sectional elevation view of powered release rod in relationship to a side-entry door of a cage trap.

FIG. 7 is a sectional elevation view of the support mechanism as a single-pull mechanism for a guillotine-style cage trap in accordance with an embodiment of the invention.

FIG. 8 is a sectional elevation view of a double push-pull support mechanism in accordance with an embodiment of the invention.

FIG. 9 is a left-hand isometric view of a slotted-end double support mechanism in accordance with an embodiment of the invention.

FIG. 10 is a combination of a top plan view and a front elevation view of the slotted-end double support mechanism.

FIG. 11 is a sectional elevation view along line A-A of FIG. 10 of the slotted-end double support mechanism.

FIG. 12 is a section elevation view along line B-B of FIG. 10 of the slotted-end double support mechanism.

FIG. 13 is a left-hand isometric view of a tabbed single support mechanism in accordance with an embodiment of the invention.

FIG. 14 is a combination of a top plan view, front elevation view and side elevation view of the tabbed single support mechanism shown in FIG. 13.

FAST DOOR EXAMPLE

FIGS. 1-7 listed as follows illustrate a second exemplary embodiment of the invention, to wit: a fast door powered closure side-entry door cage trap.

Figure 1:
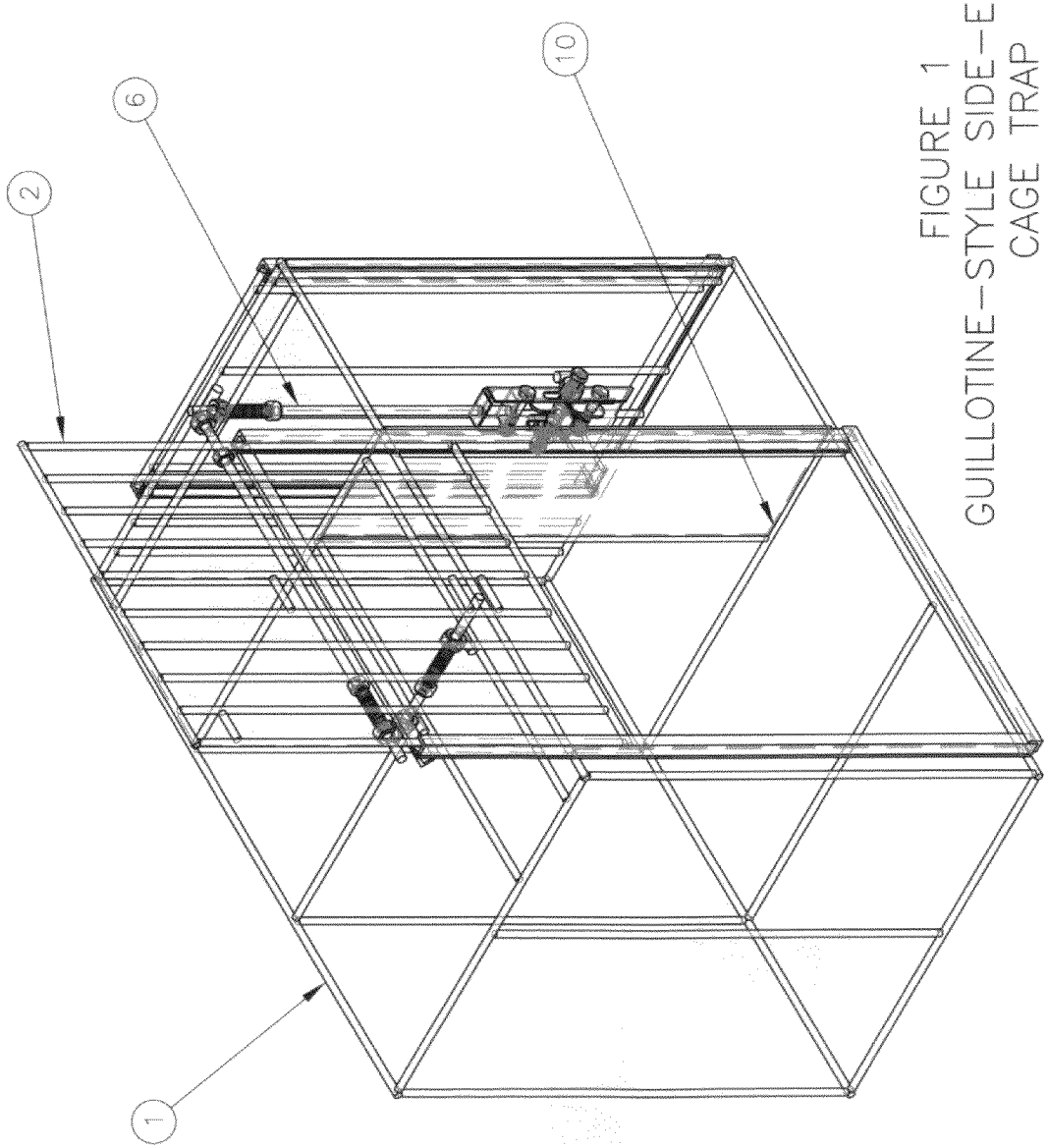
FIGS. 1-14 listed as follows illustrate a first exemplary embodiment of the invention, to wit: a guillotine-style side-entry door cage trap.

FIG. 1 is a left-hand isometric view of a powered closure side-entry door cage trap with a support mechanism in accordance with an embodiment of the invention.

Figure 2:
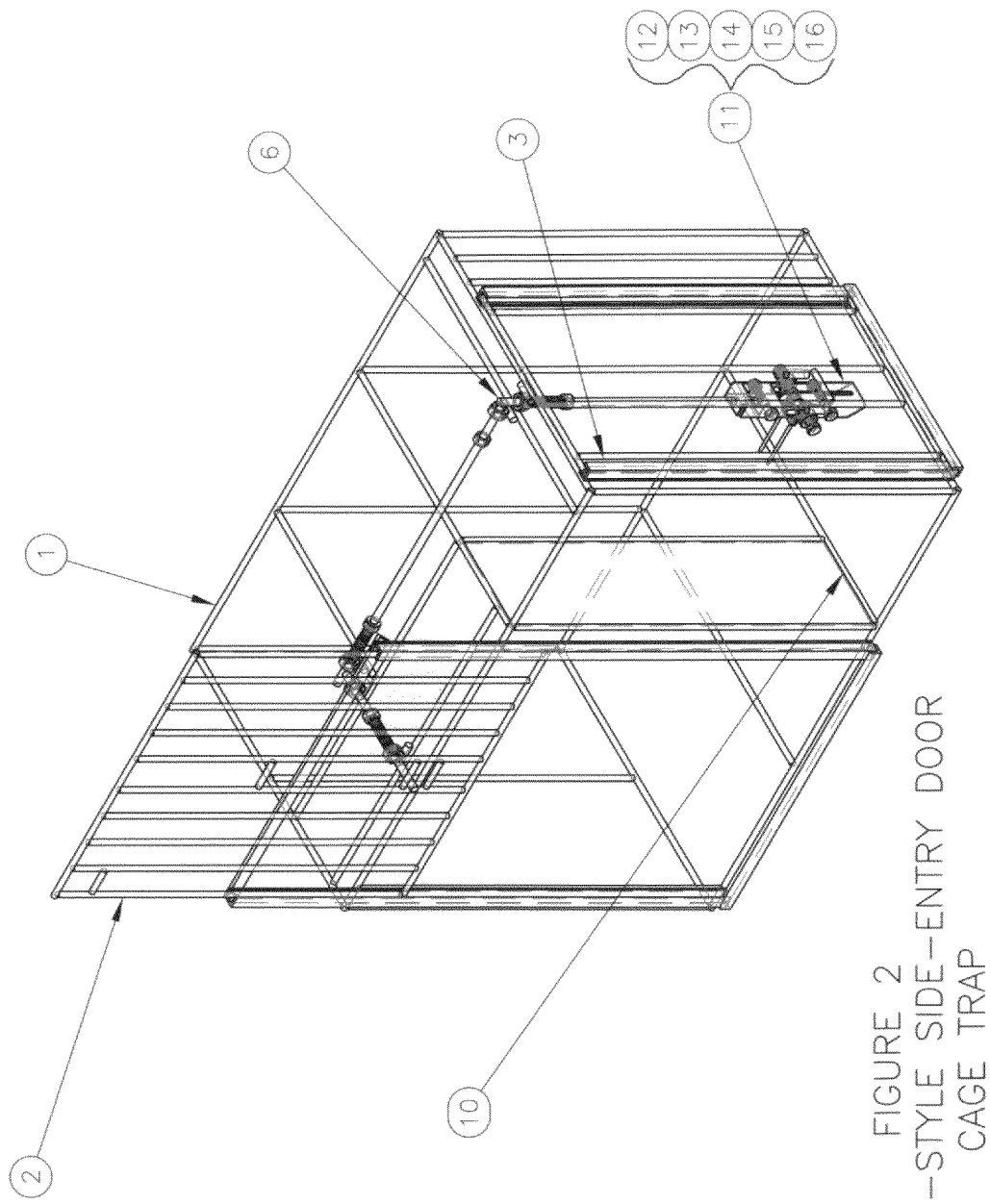

FIG. 2 is a right-hand isometric view of a powered closure side-entry door cage trap with the support mechanism according to the invention.

Figure 3:
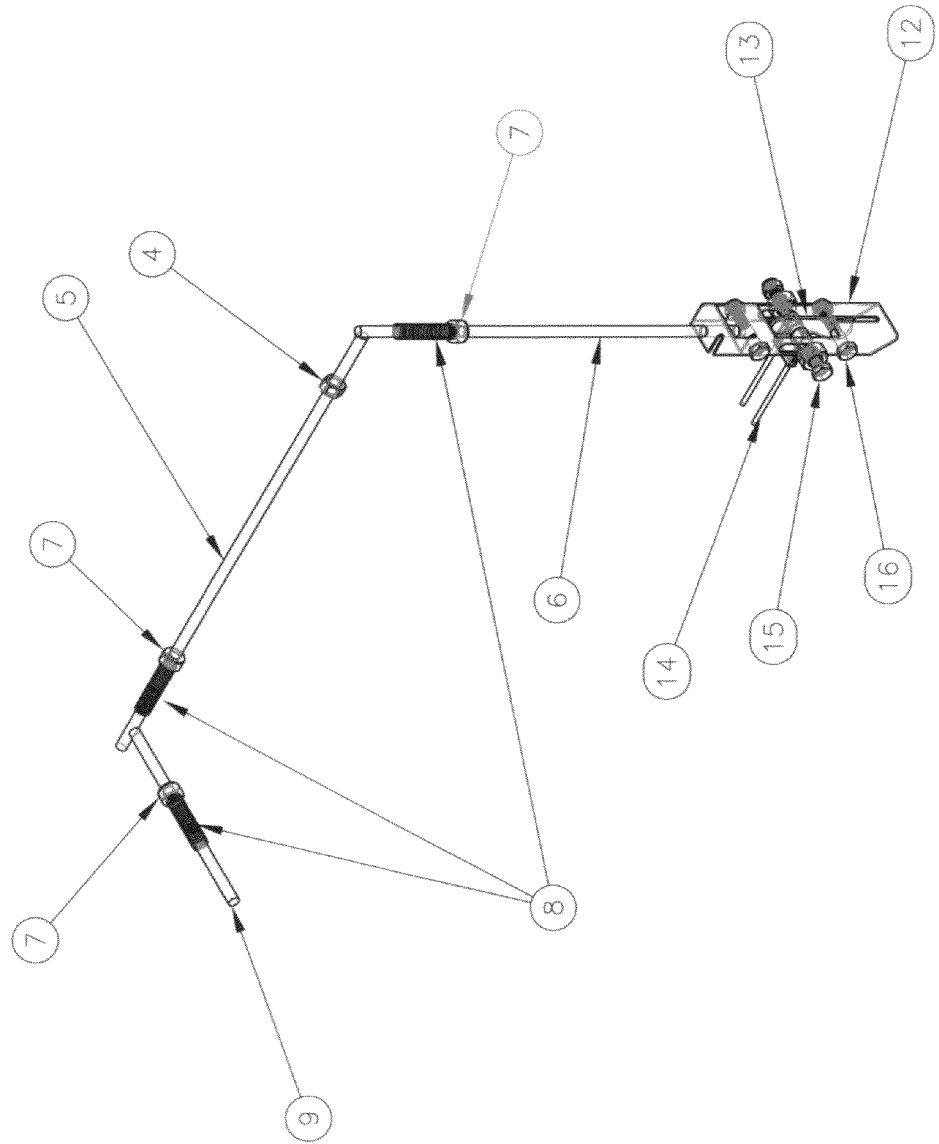

FIG. 3 is a right-hand isometric view of a powered door assembly and powered lock rods in a typical arrangement as manifest in a powered closure side-entry door cage trap.

Figure 4:
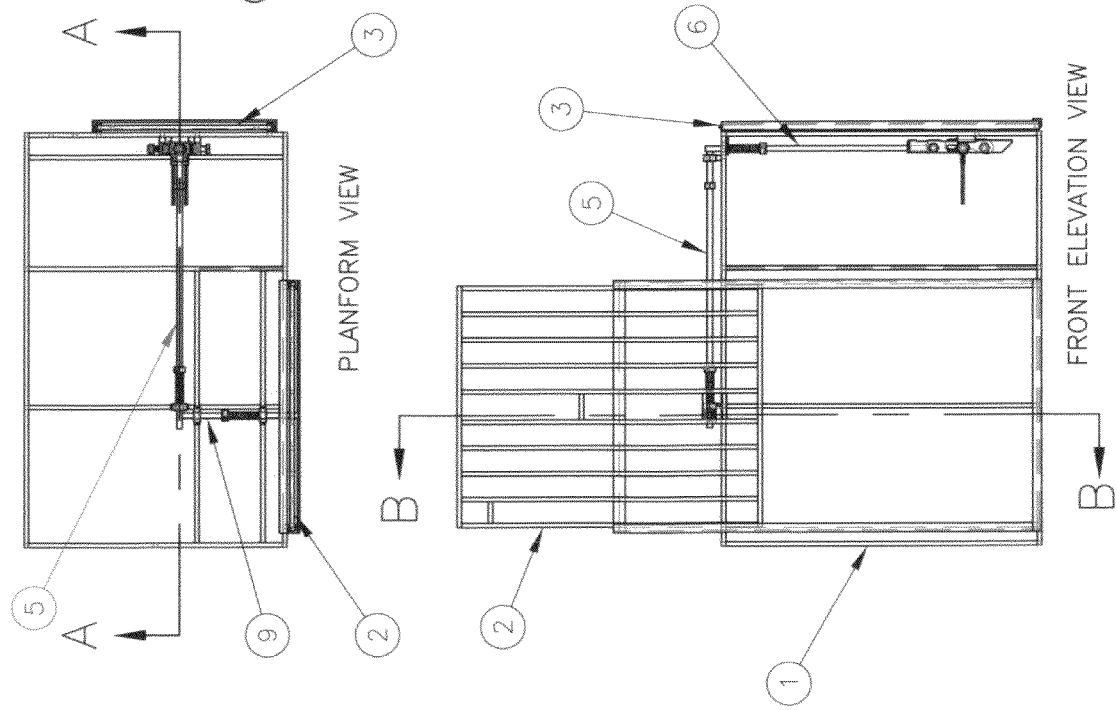

FIG. 4 is a right-hand isometric view of a support mechanism, powered release rods, and powered lock rods.

Figure 5:
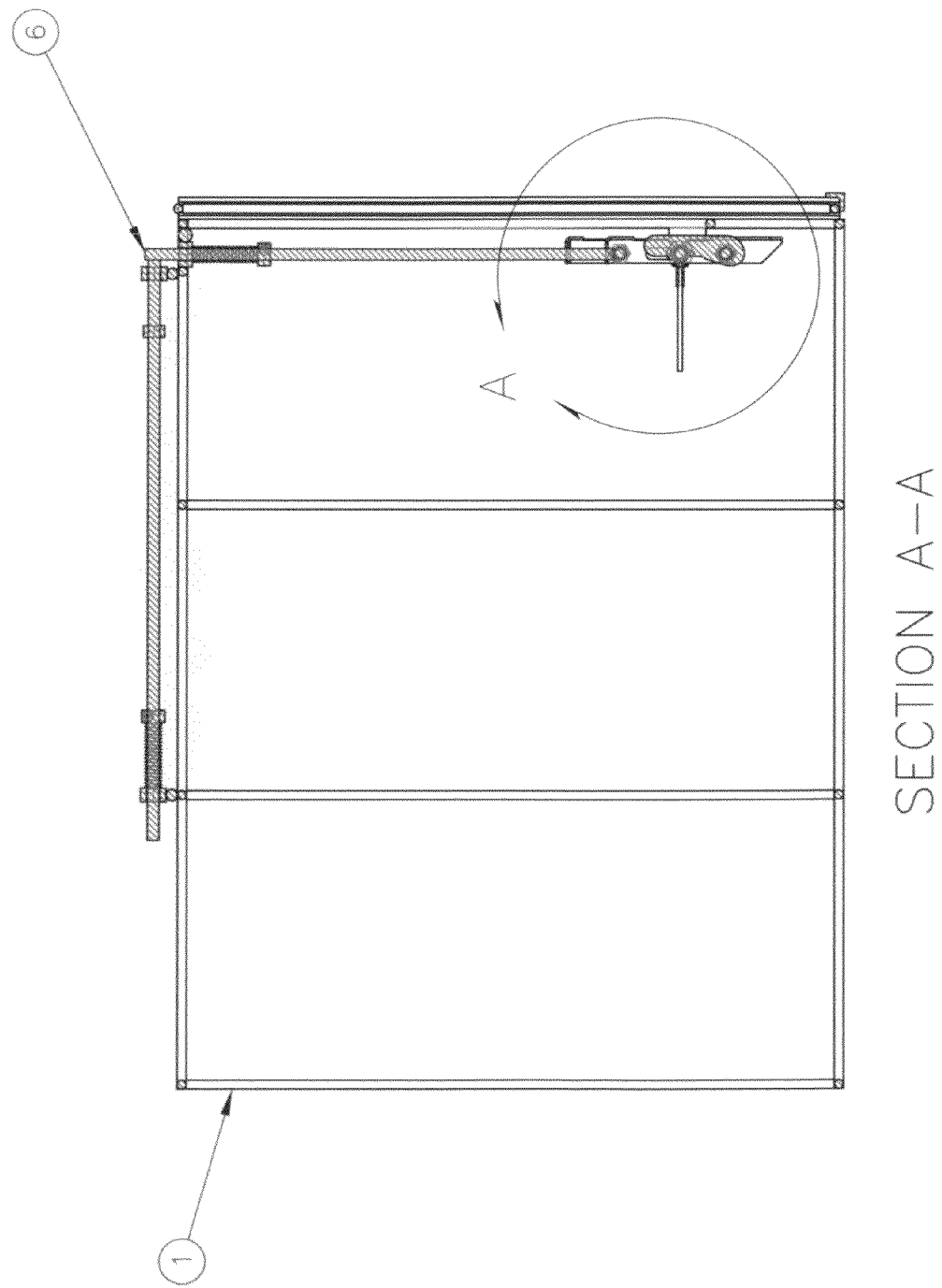

FIG. 5 is a combination of a plan view, a front elevation view, and a side elevation view of a powered closure side-entry door cage trap with a support mechanism arranged in accordance with an embodiment of the invention.

Figure 6:
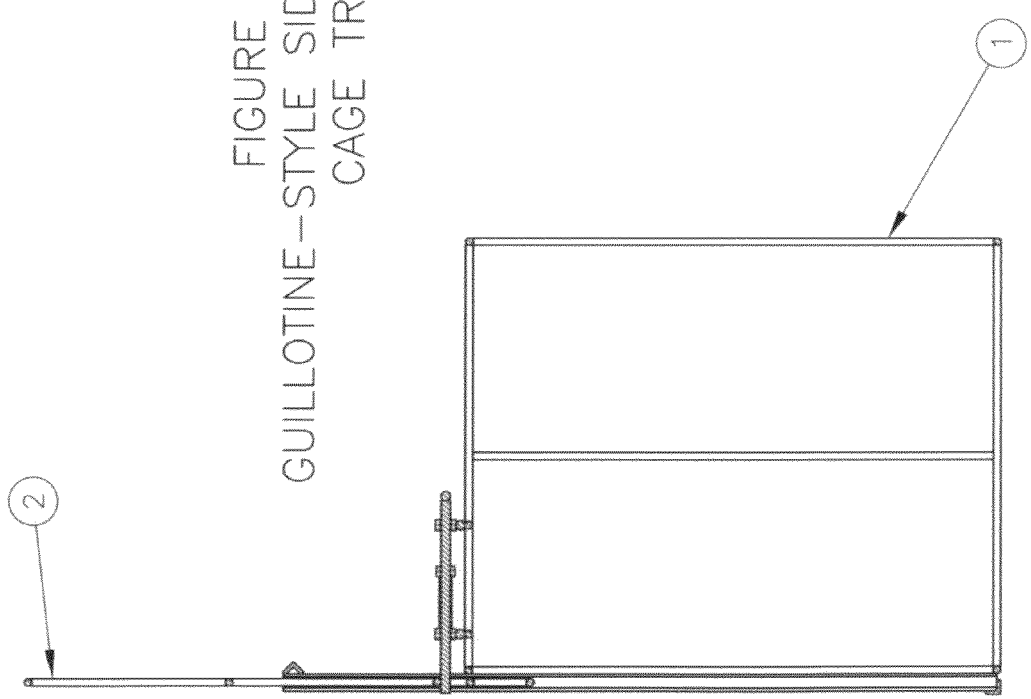

FIG. 6 is a sectional elevation view along line A-A of FIG. 5 illustrating a powered closure side-entry cage trap showing how firing of the trap is accomplished with the powered support mechanism in accordance with the invention.

Figure 7:
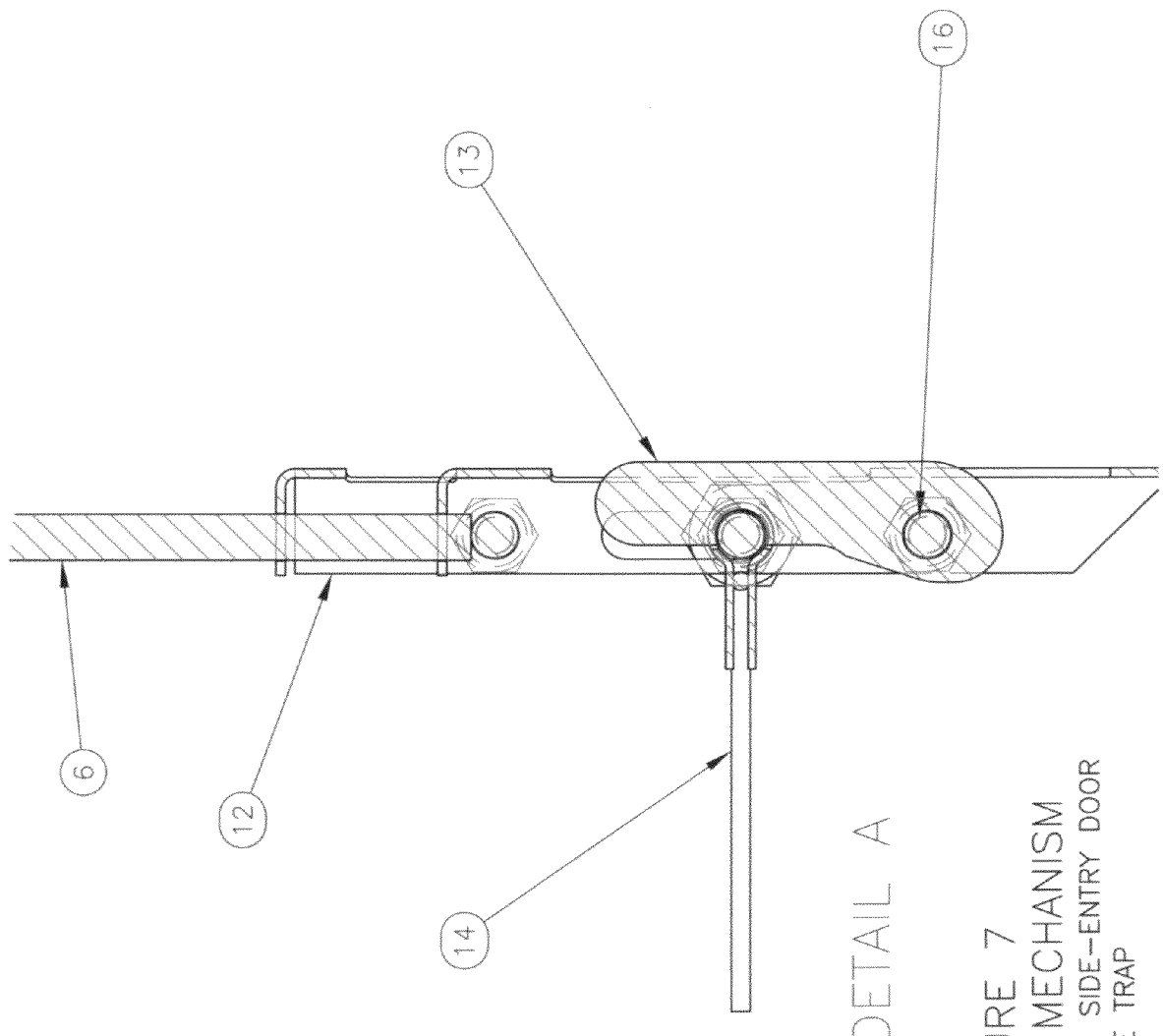

FIG. 7 is a sectional elevation view along line B-B of FIG. 5 illustrating the powered closure relationship of the trigger and the support mechanism in accordance with the invention.

DETAILED DESCRIPTION OF THE INVENTION

With reference to the drawings, FIG. 1 and FIG. 2 of the Guillotine Style Door Example depict an embodiment of a side-entry cage-type animal trap using the support mechanism of the invention. In the particular embodiment, the side entry cage-type trap 1 is formed generally in the shape of a box. However, those in the art should appreciate that cage traps may have any shape that has an interior volume large enough to house an animal to be trapped. Furthermore, the side entry cage-type trap includes a frame 1 and includes a covering or housing (not shown) fashioned of mesh, webbing, other crisscrossed pattern or design. The housing can be made of multiple structural elements.

The side entry cage type trap has a frame 1 includes a powered trigger. The powered trigger of the present invention includes a support mechanism 11 in combination with a dog 13, a trigger 14, a rod 6, springs 8, shaft collars 7, sliding door 2, and restricting partition 10. The rod is powered by the combination of a spring and shaft collar abutting a structural element of the frame 1. Thus, the rod, which is connected to the support mechanism 11, may be referred to herein as a SM powered release rod 6.

The depiction in FIGS. 1 and 2 shows a single door trap. However, multiple doors could be used or applied and not affect the operation of the advanced powered trigger system enabled by the support mechanism taught. For example, another side entry door could be placed opposite of existing door as well as a direct entry (as opposed to entry from the side of the trap) door opposite of the support mechanism. The doors may fire all at the same time through successive movements of additional rods 5 that may be placed accordingly and powered by springs.

Referring further to the drawings, FIG. 3 and FIG. 4 of the guillotine style door example depict the relationship of all of the firing components of the guillotine side-door animal trap to their function on the trap. The support mechanism is engaged by pushing st powered release rod 9 under door 2, then placing the next powered release rod 5 behind the st powered release rod 2. A rod stop (not shown) holds these two rods in place until the support mechanism 12 is pushed into place, which causes the dog to engage over the pivot component or trigger slot. When an animal pushes, grabs, pulls, or moves the trigger 14, the sequence reverses from last rod (the rod attached to the support mechanism) to the first rod releasing the door. Because of the powered support mechanism design the sliding doors may be powered and not affect the sensitivity of the trigger.

Figure 8:
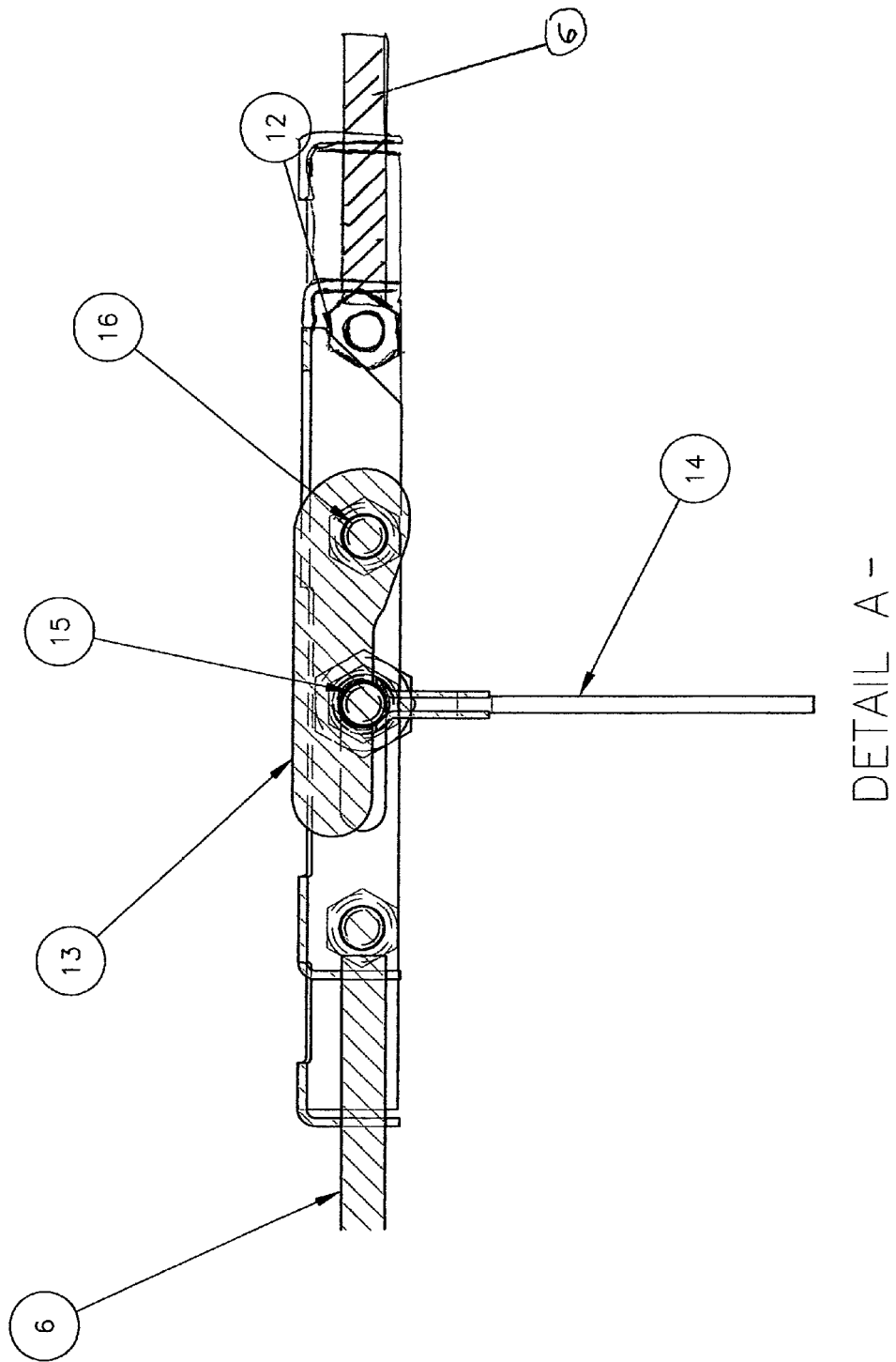
Figure 9:
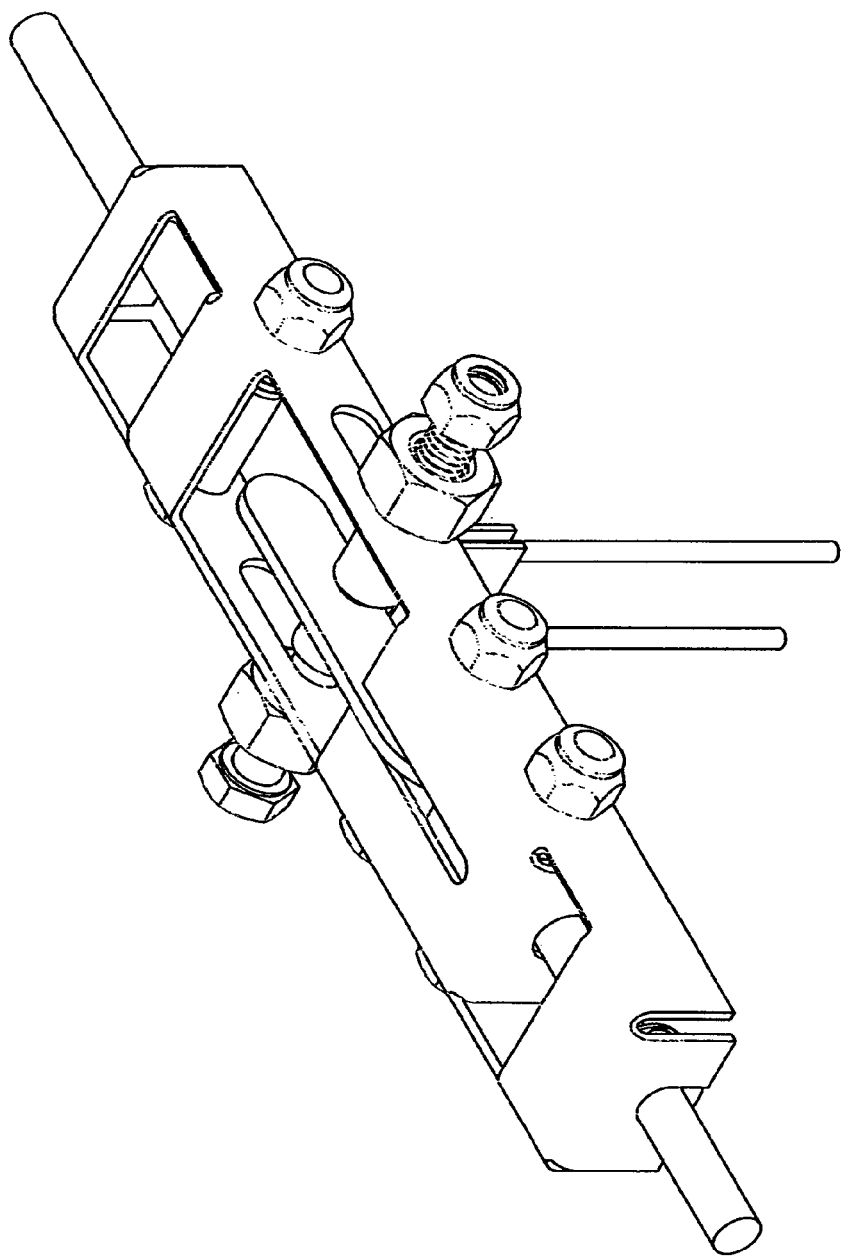
Figure 10:
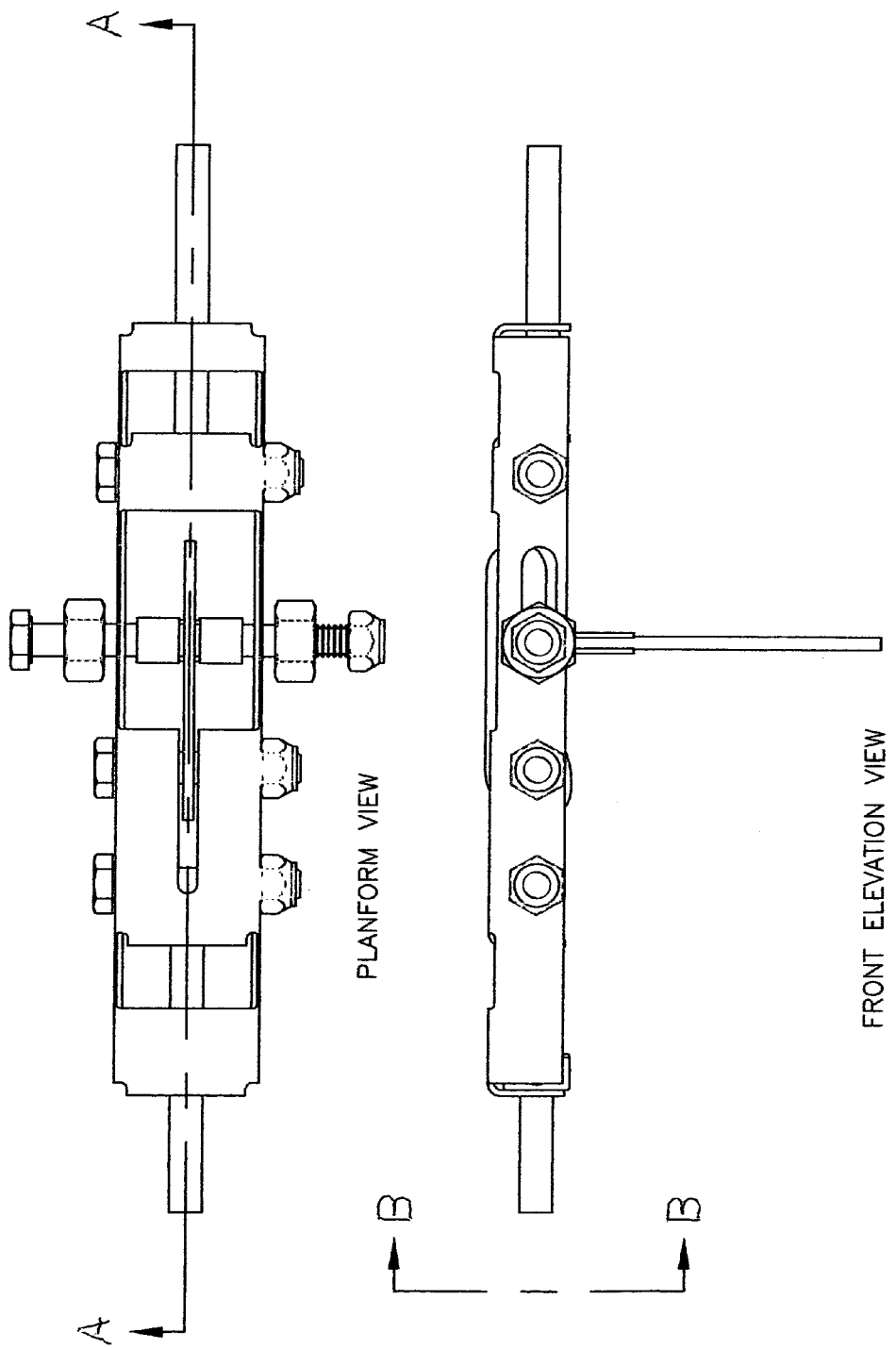
Figure 11:
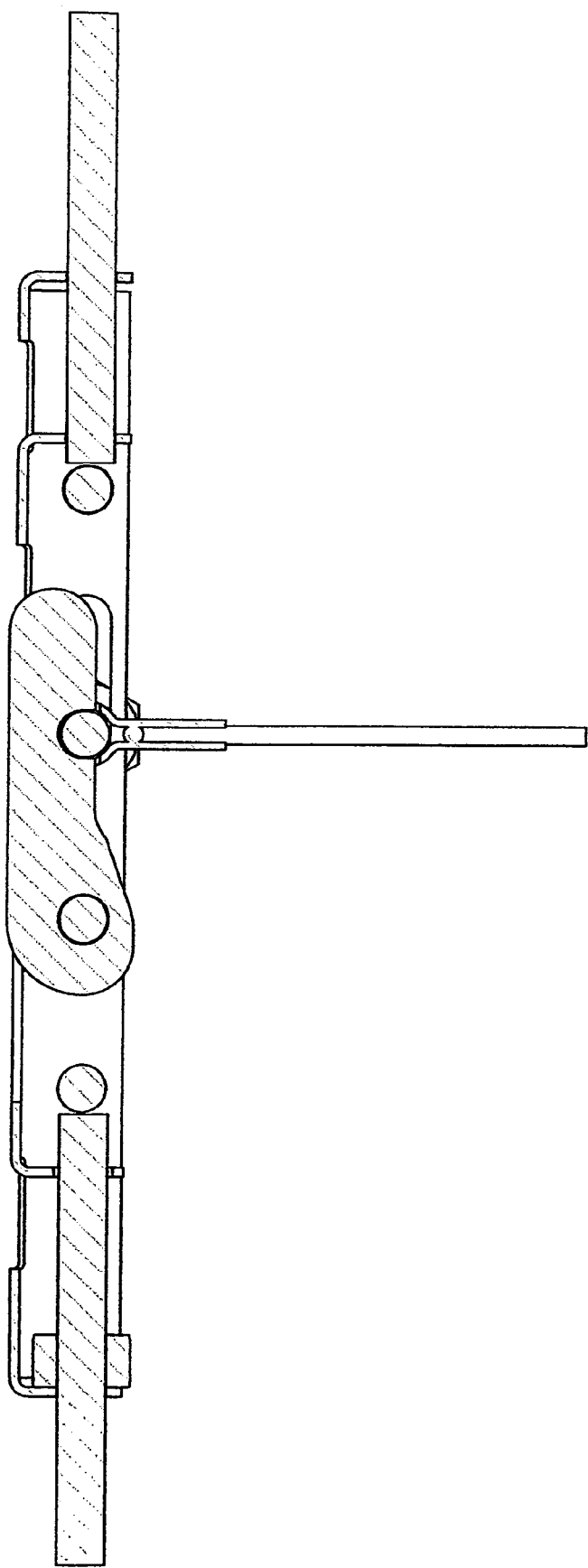
Figure 12:
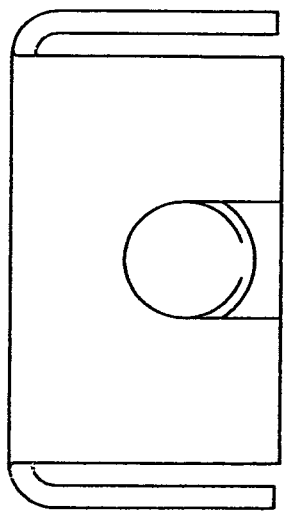

Embodiments of the support mechanism and related components can be seen in FIG. 7 and FIG. 8. The support mechanism supports the actions of its related components so as to maximize the efficiency of their actions. It places in proper alignment the components and holds them at the correct angles and relationships so as to allow maximum support for their functions. Without the support mechanism, the functions of the related components would be limited and not allow for new trap designs and modifications.

In FIG. 8 the pivot component includes a trigger and dog support bolt 15. The pivot component is held by inserting the bolt 15 through an elongate slot on each side of the support mechanism and also inserting through a structural component of the frame 1. The trigger 14 is attached to the bottom of the pivot component, and when the trigger moves, a cam on the pivot component releases the dog 13 from a support on the pivot component. The dog may engage the pivot component with a recessed portion to retain the dog on the pivot component until nudged by the cam and released as seen in FIG. 7. The recessed portion of the dog is distally separate from the dog support bolt 16 that allows the dog to pivot and release the opposing end with the recessed portion from the pivot component.

FIG. 9, FIG. 10, FIG. 11, and FIG. 12 depict a double support mechanism with a slotted end forming a slotted tab for the rod guide. Each slotted tab cooperates with the rod support member, which may comprise the rod support bolt. The rod is attached to the support mechanism at one or both ends by a retention nut situated on the rod and the combination of the slotted tab and the rod abutting against the rod support bolt. This double ended support mechanism allows sm powered release rods to be attached on both ends of the support mechanism. This allows for a more versatile mechanism that supports traps with two or more doors, thus providing an efficient and cost saving function.

Figure 13:
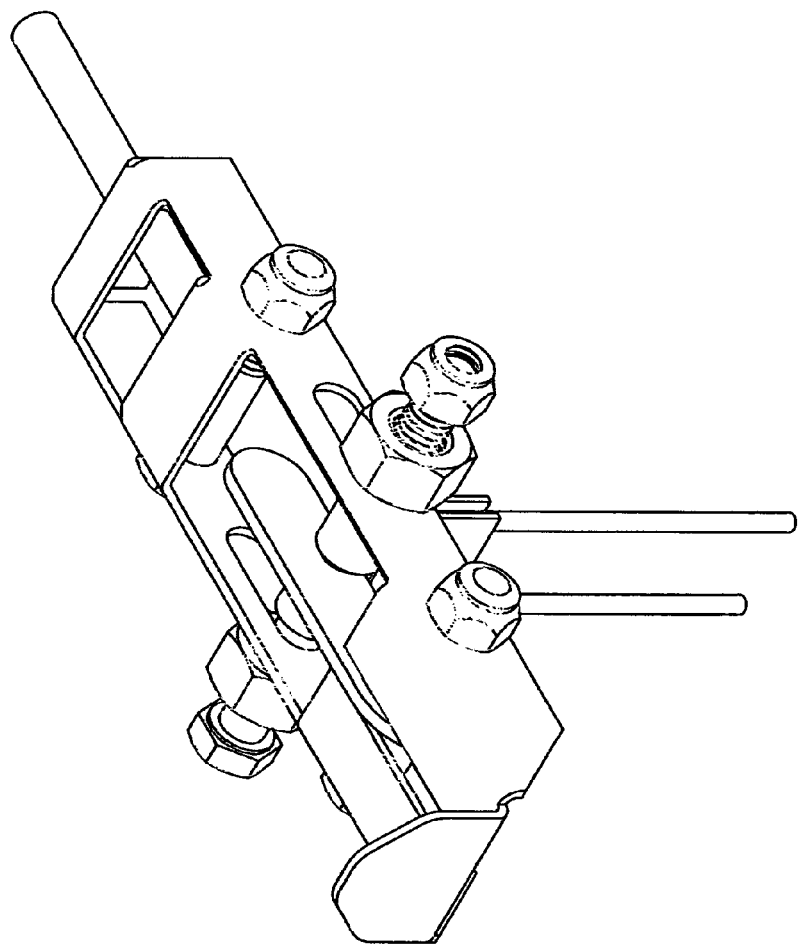
Figure 14:
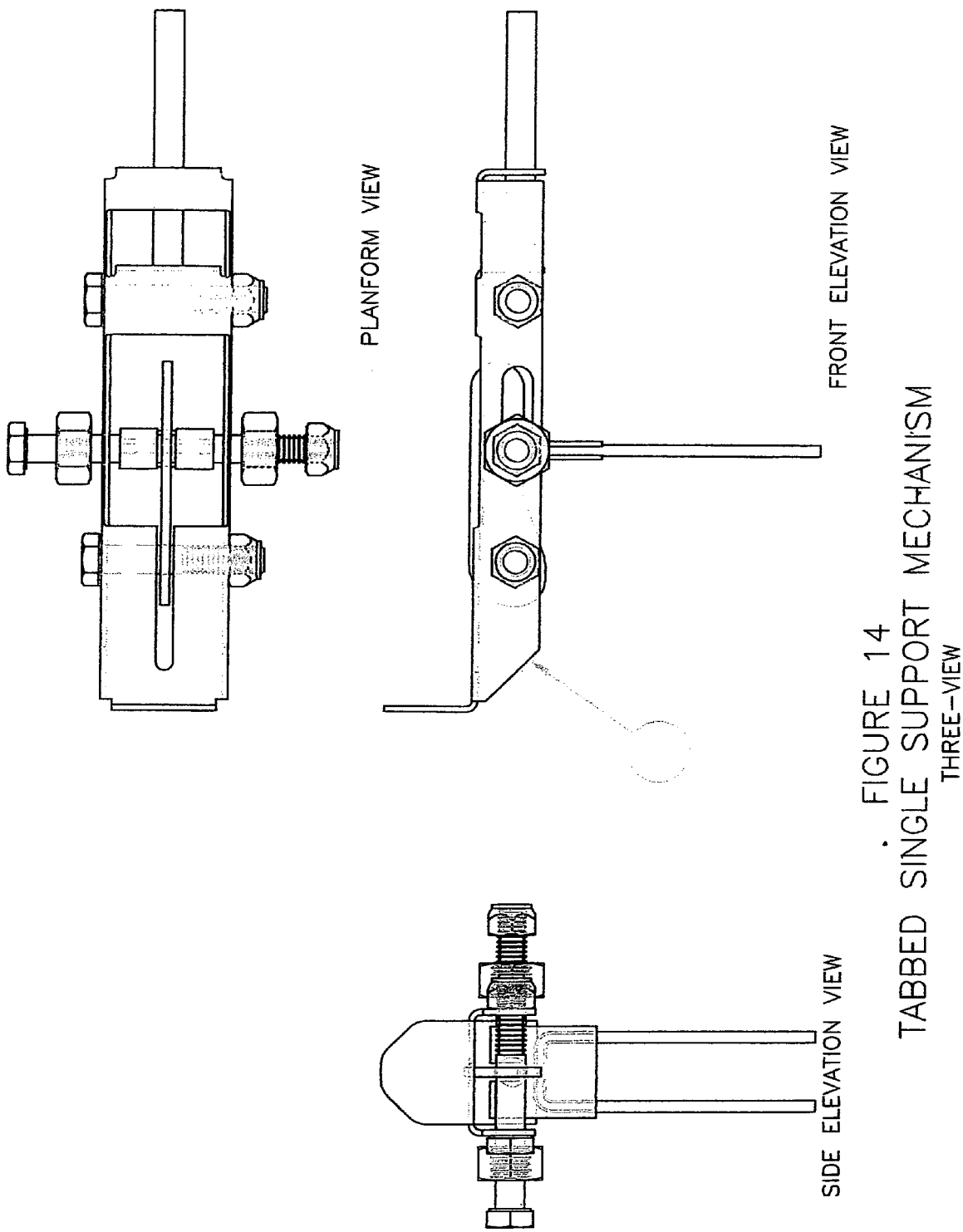

FIG. 13 and FIG. 14 depict a tabbed single support mechanism. By tabbing the support mechanism, the setting function is more easily achieved when placed the mechanism inside or outside the trap or enclosure, or on its doors.

With reference to the drawings, FIG. 1, FIG. 2 and FIG. 3 of the Fast Door Example illustrate another embodiment of the invention. The same or simulated aspects of a guillotine side door trap as in the first example are much like the powered fast door trap. The difference is mainly seen in the door release 4, arrangement of the doors 2 to the frame 1, door locks 5, and the arrangement of door coil springs 10 for power. The support mechanism function is the same, but functions to activate the trap using a different release method. The release bar 4 is pulled when the trigger is moved to activate the pivot component and causes the dog to release after the mechanism had been placed in the set position. Again, this is made to operate smoothly by the support mechanism 12.

Referring to the drawings, FIG. 1, FIG. 2 and FIG. 3 in the Fast Door Example depict the relationship of the firing components of the fast door side-door trap. The trap is set by squeezing the lock rods 5 to release the door 2. The release bar 4 is placed in the locked position as depicted in FIG. 1 when the door is raised. The st powered release rod 9 is pulled, and at the same time the support mechanism is pushed to the set position. The st powered release rod 9 is placed so as to engage the release bar when the support mechanism's related components are activated by movement of the trigger. When the trigger is moved, the sequence of events is reversed allowing for the release bar to be moved and the door 2 to close pushing the animal sideways into the trap. The support mechanism 11 allows for this function to be repeated in a like manner on most or all cage, corral, or box type traps.

The advanced power trigger system taught by the present invention for cage-type animal traps includes a catch member, also referred to as a pivot component portion for engagement of a dog, a movable latch related to a door, and a spring operable via a rod between the catch member engaging the dog and the latch. Engagement of the catch member and rod to the latch exerts a force tending the latch toward powered disengagement from the cage door via the spring.

The invention claimed is:

1. An animal trap comprising:
    a frame;
    a support mechanism including an elongate slot on each side of the support mechanism and including a combination of a rod guide and a rod support member on at least one end of the support mechanism;
    a pivot component situated within the elongate slot of the support mechanism and the pivot component including a dog support portion including a cam, and said pivot component pivotally connected to a structural element of the frame;
    a dog that is pivotally attached to the support mechanism by a dog support member and said dog having a recessed portion distally separated from the dog support member for engaging the dog support portion of the pivot component when the trap is set for entrapment of an animal and said recessed portion of the dog interacting with the cam on the pivot mechanism when the pivot component rotates to release the dog from the dog support portion of the pivot component when the trap is activated;

a trigger connected to the pivot component which causes the pivot component to rotate when the trigger is moved; and at least one rod operated by the support mechanism to release a door for closure of the trap when the dog is released.

2. An animal trap as in claim 1 in which said rod guide comprises a slotted tab, said rod support member comprises a rod support bolt, and said rod is attached to at least one end of the support mechanism by a retention nut situated on the rod and the combination of the slotted tab and the rod abutting against the rod support bolt.

3. An animal trap as in claim 1 in which said animal trap is a guillotine style door cage trap.

4. An animal trap as in claim 1 in which said animal trap is a powered closure fast door trap.

5. An animal trap as in claim 1 in which said trigger comprises a wire protruding into an interior volume of the frame.

6. An animal trap as in claim 1 in which said rod guide and rod support member are situated on both ends of the support mechanism and a first rod and a second rod of said at least one rod are attached to each end of the support mechanism by the combination of the rod guide and rod support member, and the first rod operates by pulling with respect to a latch and the second rod operates by pushing with respect to a latch, causing release of more than one door for closure of the trap when the dog is released.

7. An animal trap as in claim 1 in which said rod engages a movable latch that holds the door open and the latch is released by movement of the rod causing closure of the trap.

8. An animal trap as in claim 1 in which each of said at least one rod includes a collar and a spring abutting a structural member of the frame, whereby the rod is a powered release rod by spring loading the rod when the dog engages the pivot component.

* * * * *